Dec. 30, 1969

B. A. LOOMANS 3,486,664

MATERIAL FEEDING DEVICE FOR A CONTINUOUS
MIXER, REACTOR, OR THE LIKE

Filed Dec. 12, 1967

INVENTOR
BERNARD A. LOOMANS

BY

*Learman, Learman & McCulloch*

3,486,664
MATERIAL FEEDING DEVICE FOR A CONTINUOUS MIXER, REACTOR, OR THE LIKE
Bernard A. Loomans, Saginaw, Mich., assignor to Baker Perkins Inc., Saginaw, Mich., a corporation of New York
Filed Dec. 12, 1967, Ser. No. 689,997
Int. Cl. G01f 11/20
U.S. Cl. 222—413                10 Claims

ABSTRACT OF THE DISCLOSURE

A feeding device utilizing a stationary hopper having a reduced size throat portion receiving a feed screw which is partly housed within a casing rotatably mounted within the hopper. Scrapper blades are mounted on the inner casing to rotate within the outer casing and move material to the feed screw, and the feed screw and inner casing are separately driven so that they may be counterrotated at different speeds.

---

The invention relates particularly to feeding apparatus suited to feeding difficult-to-feed material, such as wet clay, pigment filter cake, and other solids with a high moisture content, to a continuous vacuum mixer wherein mixing preferably takes place under vacuum conditions.

One of the prime objects of the invention is to provide a feeding device of the character disclosed which is particularly suited to feeding and volumetrically metering materials of this character which cannot readily be metered in conventional belt-feeding or vibrating screw feeding equipment.

A further object of the invention is to provide a feeding device of the design indicated which incorporates a seal with the other elements, so that a vacuum can be maintained in the barrel of the mixer which the feeder supplies.

Still another object of the invention is to provide a feeder assembly incorporating a vertical feed screw and a scraper device for supplying material to the feed screw and wherein the feed screw and scraper blades are independently driven so that they may be driven at different speeds and it is possible to control the throughput rate of the feeder for a range of products having different densities.

Other objects and advantages of the invention will be pointed out specifically or will become apparent from the following description when it is considered in conjunction with the appended claims and the accompanying drawings, in which:

Figure 1:
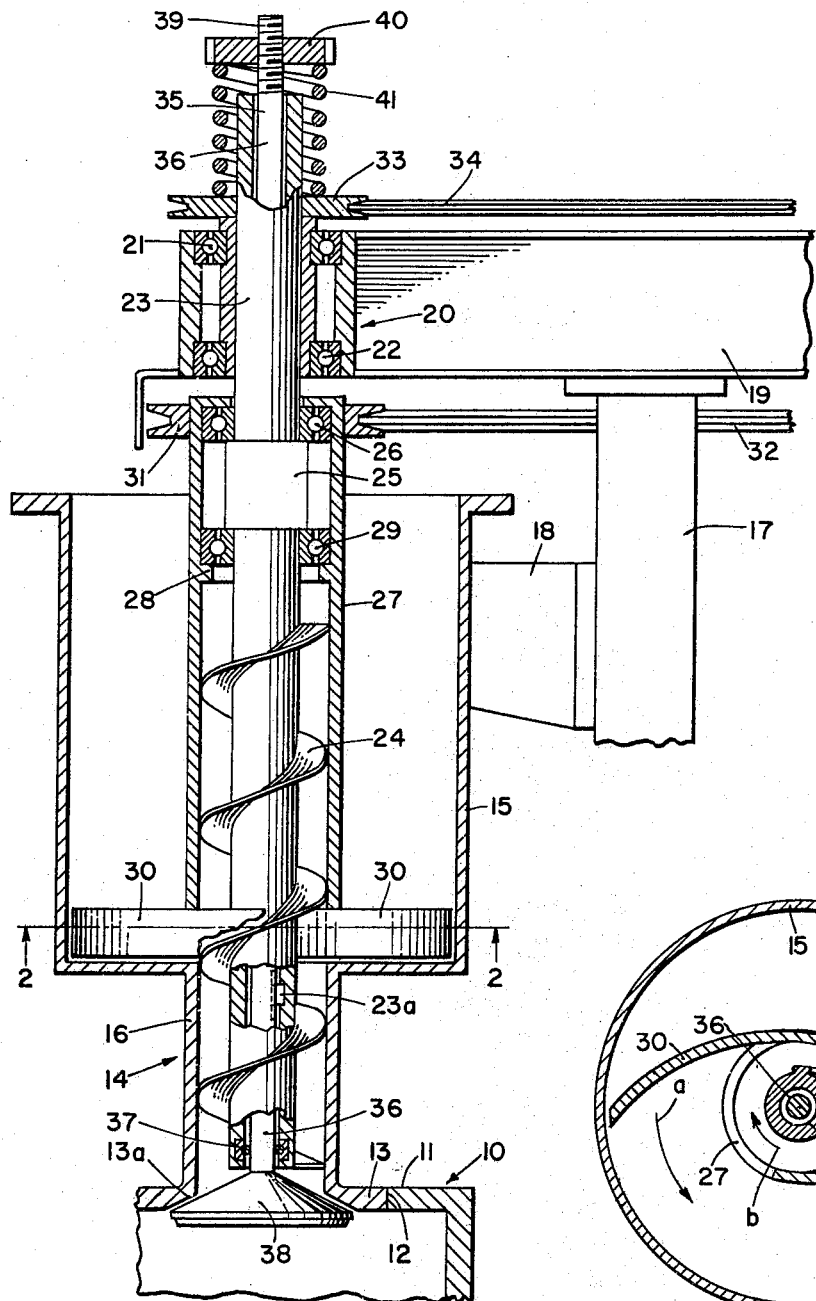
FIGURE 1 is a sectional, side elevational view showing the feeder apparatus connected with a typical vacuum mixer.

Referring now more particularly to the accompanying drawings, I have shown in FIGURE 1 a mixer generally designated 10 and having a top wall 11 with an annular opening 12 provided therein. The mixer may comprise a mixing and kneading machine of the type disclosed in U.S. Patent No. 3,023,455, which is adaptable to a wide variety of processing applications from light blending to heavy, intense kneading in the chemical, food processing and foundry industries. The bottom flange 13 of a tubular outer hopper assembly generally designated 14 is secured within the opening 12 and is provided with a frusto-conical seating surface 13a for a purpose which will later become apparent. As FIGURE 1 indicates, the hopper assembly 14 includes an upper, material receiving hopper portion 15 and a reduced size, cylindrical throat tube 16 and is stationarily supported from a support post 17 by means of a suitable bracket 18.

Also provided on the support post 17 is a support rail 19 mounting a roller bearing assembly generally designated 20 and including upper and lower roller bearing assemblies 21 and 22 which journal a vertical screw shaft 23 having a continuous, uninterrupted helical advancing flight 24 on its lower end, as shown. The flight 24 is diametrically received by the inner peripheral surface of the reduced tubular portion 16 of hopper assembly 14 in such a manner as to convey material downwardly in the tube 16, the flight 24 having a running clearance only within the tube 16. Provided on the shaft 23 is a shoulder portion 25 mounting an upper bearing assembly 26 which supports a rotating, tubular housing or casing 27 for the uppermost portion of flight 24, the tubular housing 27 being of the same diameter as tubular casing 16 so that the flight 24 has only a running clearance therein. Support lugs 28 on the inner wall of housing 27 support a lower bearing assembly 29 which, with the bearing assembly 26, journals the casing 27 for relative rotation with the shaft 23.

On the lower end of the housing 27, curvilinear radial scraper members 30 project tangentially, as shown, and revolve with the housing 27 which terminates in a lower edge 27a to move material from the hopper 15 into the tubular casing section 16. A pulley 31 keyed to the housing 27 may be driven at a particular speed by a belt 32 connected with a suitable electric drive motor, and a similar pulley 33 on shaft 23, connected by a drive belt 34 to another electric motor, may be driven by the separate motor at a different speed and in an opposite direction of rotation. The shaft 23 is vertically bored as at 35 to receive a rod 36 which is keyed as at 23a to rotate with the shaft 23 but is capable of axial movement with respect to it. At its lower end the rod 36 extends through a seal member 37 mounted by the shaft 23 and carries a conical plug 38 which normally is disposed adjacent the seating surface 13a, as shown in FIGURE 1. At its upper end the rod 36 extends above the tubular shaft 23 and is threaded as at 39 to receive a nut member 40. Interposed between the pulley 33 and the nut 40 on the shaft 23 is a coil spring 41 in a state of compression such that it normally urges the plug 38 into engagement with the surface 13a. With adjustment of the nut 40, the pressure exerted by the spring 41 can, of course, be varied.

OPERATION

Figure 2:
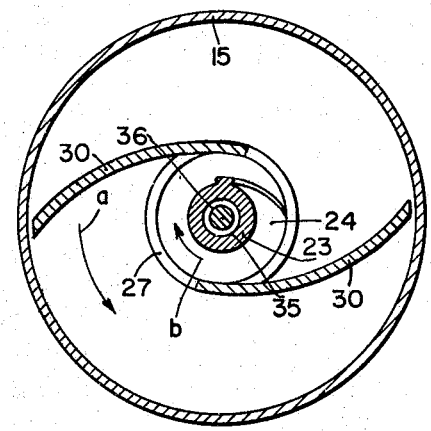
FIGURE 2 is a transverse sectional view taken on the line 2—2 of FIGURE 1.

In operation it is to be understood that material is fed into the stationary hopper portion 15 and is moved by the scraper blades 30 rotating in the direction a (see FIGURE 2) to the feed screw flight 24 which is rotating in the opposite direction b. The material being advanced downwardly by the feed screw flight 24 is squeezed out between the plug 38 and seat surface 13a, with the material forming a seal so as not to affect the vacuum condition within the mixer 10. When no material is being fed through the apparatus, the spring 41 maintains the plug 38 in vacuum tight engagement with the surface 13a. By varying the force exerted by spring 41 and the speeds of rotation of shaft 23 and scraper blades 30, the desired throughput of material may be maintained for particular materials. Because the flight 24 extends upwardly into the casing 27, there is no danger of material being trapped in the casing 27.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. Feeder means for moving material to a mixer, reactor or like apparatus comprising: tubular throat means leading to the apparatus; advancing screw means axially disposed therein; enlarged hopper means emptying into said throat means; material moving means for said hopper means for moving material therein to said screw means; means for driving said screw means and material moving means independently; said screw means extending into said hopper means; and a rotary housing for said screw means being supported within said hopper means.

2. The combination defined in claim 1 in which said blades are driven in counterrotation to said screw.

3. The combination defined in claim 1 in which said blades and screw are driven at different speeds of rotation.

4. The combination defined in claim 1 in which said throat means has a seating surface formed thereon and rotary plug means is movable axially toward and away therefrom to meter material to the apparatus; spring means being provided to normally urge said plug means toward said seating surface.

5. Feeder means for moving material to a mixer, reactor or like apparatus comprising: hopper means having a reduced throat portion leading to the apparatus; a tubular casing supported in said hopper means for movement therein; material moving means on said casing for advancing material to the throat portion; material advancing shaft means in said throat portion; drive means connected therewith and extending through said tubular casing; and means for driving said casing and shaft means.

6. Feeder means for moving material to a mixer, reactor or like apparatus comprising: tubular throat means leading to the apparatus; advancing screw means axially disposed therein; enlarged hopper means emptying into said throat means; material moving means for said hopper means for moving material therein to said screw means; means for driving said screw means and material moving means independently; and a material metering member rotatable with the screw downstream thereof for restricting the flow of material from said throat means.

7. The combination defined in claim 6 in which said connecting means comprises a rod extending through and beyond said screw shaft and having a threaded end with nut means adjustably mounted thereon; spring means being provided to bear against said nut means and urge said metering member in a direction toward said screw to tend to restrict the flow of material from the throat means to the mixer.

8. The combination defined in claim 7 in which said rod is keyed to said screw shaft so that it rotates with the shaft but is capable of relative axial movement therewith.

9. Feeder means as set forth in claim 6 wherein said screw means includes a tubular shaft; and means extending through said tubular shaft connected with said metering member and biasing it to move toward said screw means.

10. Feeder means for moving material to a mixer, reactor or like apparatus comprising: tubular throat means leading to the apparatus; advancing screw means axially disposed therein; enlarged hopper means emptying into said throat means; material moving means for said hopper means for moving material therein to said screw means; and means for driving said screw means and material moving means independently; said material moving means and said advancing screw means being concentrically disposed.

References Cited

UNITED STATES PATENTS

| 3,173,400 | 3/1965 | Heitshu | 198—64 |
| 3,258,165 | 6/1966 | Guyer | 198—64 |
| 3,333,679 | 8/1967 | Zimmermann | 222—413 |
| 3,341,280 | 9/1967 | Eolkin | 198—64 |

FOREIGN PATENTS

| 727,530 | 4/1955 | Great Britain. |
| 261,428 | 6/1913 | Germany. |

RICHARD E. AEGERTER, Primary Examiner